Sept. 23, 1924.
C. W. SKINNER
SPRAYING NOZZLE
Filed Aug. 9, 1921
1,509,448
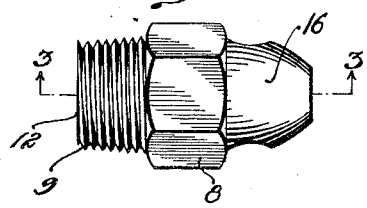
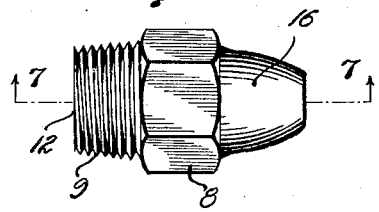
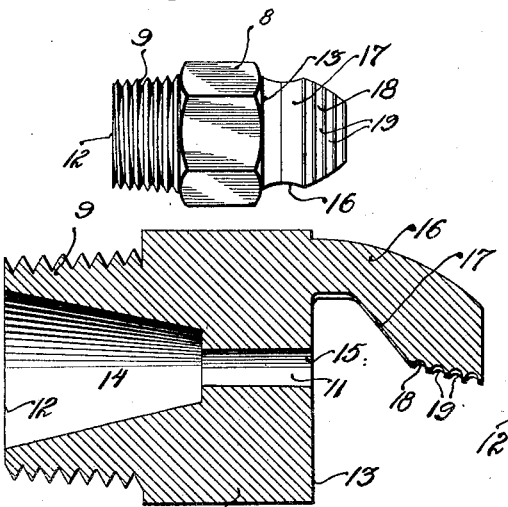
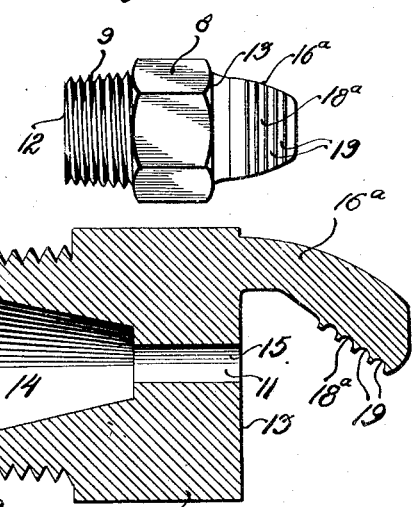
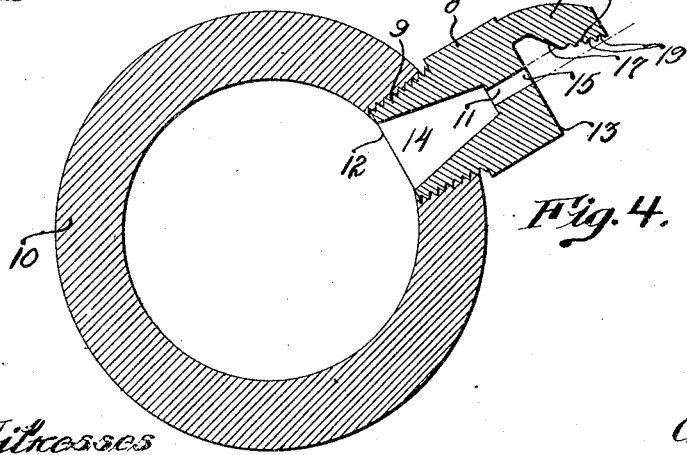

Patented Sept. 23, 1924.

1,509,448

UNITED STATES PATENT OFFICE.

CHARLES W. SKINNER, OF NEWFIELD, NEW JERSEY.

SPRAYING NOZZLE.

Application filed August 9, 1921. Serial No. 490,856.

*To all whom it may concern:*

Be it known that I, CHARLES W. SKINNER, a citizen of the United States, residing at Newfield, in the county of Gloucester and State of New Jersey, have invented certain new and useful Improvements in Spraying Nozzles, of which the following is a specification.

In irrigating apparatus, for greenhouse and field work, which includes lengths of feed water pipes having spraying nozzles, it has heretofore been practically impossible to properly water the ground close to the feed pipes and at the same time to provide a long throw of a portion of the water so as to wet the ground at a comparatively great distance from the feed pipe.

One object of my invention is to provide an improved spray nozzle which can be used in conjunction with a feed water pipe and which will be so constructed that it will effect a side spray for watering the ground adjacent the feed water pipe and at the same time will produce a long throw of the water so as to wet portions of the ground at a comparatively great distance from the feed pipe.

Another object is to make my improved nozzle of a simple and durable construction and so that it can be readily secured to a feed water pipe.

These objects, and other advantageous ends which will be described hereinafter, I attain in the following manner, reference being had to the accompanying drawings in which—

Figure 1 is a top plan view of a nozzle made in accordance with my present invention, Figure 2 is an inverted plan view of said nozzle, Figure 3 is an enlarged section taken on the line 3—3 of Figure 1, Figure 4 is a section showing said nozzle attached to a water conduit pipe, Figure 5 is a top plan view of a modified form of my improved nozzle, Figure 6 is an inverted plan view of the nozzle shown in Figure 5, and Figure 7 is an enlarged section taken on the line 7—7 of Figure 5.

Referring to the drawings and particularly to Figures 1 to 4 inclusive, 8 represents the body portion of my improved nozzle which has an externally screw threaded stem 9 to allow the nozzle to be screwed into a water conduit pipe such as the water conduit pipe 10 shown in Figure 4. The body portion 8 has a passage or duct 11 extending axially therethrough from its inner end surface 12 to its outer end surface 13. The inner end portion 14 of the duct 11 tapers inwardly from the surface 12 and provides a wide entrance opening for the water from the conduit pipe 10; the outlet portion 15 of said duct 11 being comparatively small in cross sectional diameter so that the water will pass out of said portion 15 of the duct 11 in the form of a jet.

The body portion 8 has an extension or tongue 16 which projects beyond the end surface 13 and has a surface 17 which slants relatively to the surface 13 and is spaced beyond said surface 13 so as to provide a shoulder which is disposed partly in the path of the water passing out of the portion 15 of the duct 11.

The surface 18 of the extension 16 at a position outward from the shoulder 17 is grooved transversely as shown at 19 and this grooved surface also preferably slants as illustrated and is adapted to be engaged by the water passing out of the portion 15 of the duct 11. However, as illustrated in Figure 4 by the dot-and-dash lines, the portion 15 of the duct 11 is so arranged with respect to the shoulder 17 and surface 18 that a portion of the water will engage the shoulder, another portion will engage the grooved surface 18, and another portion of the water will pass without engaging either the shoulder 17 or surface 18.

In actual use it has been found that a nozzle as above described will effect a side spray at a position adjacent the feed conduit pipe and at the same time a portion of the water which passes out of the duct, and which does not engage the extension 16, will be thrown a considerable distance from the water conduit pipe so as to properly irrigate the ground at portions adjacent the pipe and other portions at comparatively great distances from the water conduit pipe.

The extension 16 can be made integral with the body portion 8 and the shoulder 17 and surface 18 can be formed by milling or cutting the same with a circular cutter.

In the form of nozzle shown in Figures 5 to 7 inclusive, the construction is substantially the same as that described in connection with Figures 1 to 4 inclusive with the exception that the extension 16ª is devoid of the abrupt shoulder but the grooved surface 18ª is provided in alignment with the outlet duct so that a portion of the water will engage the grooved surface; the grooved surface being arranged at a slant outwardly from the duct; a portion of the water emanating from the duct being allowed to pass freely without obstruction so as to provide a long throw of the water. In all other respects the construction is similar to that described in connection with Figures 1 to 4 inclusive and I have therefore given similar parts corresponding reference characters.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A spraying nozzle including a body portion provided with a duct, and a shoulder formed integral with and extending outwardly from said body portion and having a portion slanting across a part of the outlet end of said duct, said slanting portion being provided with grooves extending transversely thereacross.

2. A spraying nozzle including a body portion provided with an externally threaded stem and a duct extending through said body portion and stem, a shoulder formed integral with said body portion and having a portion extending at a slant forward of a part of the outlet end of said duct, and alternating ridges and grooves formed at a slant across said slanting portion in front of said duct.

3. In combination with a feed water pipe having a threaded opening in its wall, a spraying nozzle having a body portion with an externally threaded stem for fastening in the threaded opening of said pipe, there being a duct through said stem and body which is narrower at its discharge end than at the receiving end in said stem, and means formed integrally with said body portion and having a transversely grooved part extending at a slant into the path of the stream issuing from said duct.

In testimony whereof I have signed my name to this specification in the presence of two subscribing witnesses.

CHARLES W. SKINNER.

Witnesses:
    CHAS. E. POTTS,
    EVELYN CROMPTON.